US006824633B2

(12) United States Patent
Chamoy

(10) Patent No.: US 6,824,633 B2
(45) Date of Patent: Nov. 30, 2004

(54) METHOD AND APPARATUS OF TREADING A TIRE CARCASS

(75) Inventor: Francois Chamoy, Chamalières (FR)

(73) Assignee: Michelin Recherche et Technique, S.A., Granges-Paccot (CH)

(*) Notice: Subject to any disclaimer, the term of this patent is extended or adjusted under 35 U.S.C. 154(b) by 231 days.

(21) Appl. No.: 09/956,154

(22) Filed: Sep. 19, 2001

(65) Prior Publication Data
US 2002/0040755 A1 Apr. 11, 2002

Related U.S. Application Data

(63) Continuation of application No. PCT/EP00/02321, filed on Mar. 16, 2000.

(30) Foreign Application Priority Data

Mar. 19, 1999 (FR) .............................. 99 03499

(51) Int. Cl.$^7$ ............................................. B29D 30/54
(52) U.S. Cl. ..................... 156/96; 156/128.1; 156/909
(58) Field of Search ........................... 156/96, 117, 130, 156/128.1, 130.5, 909, 394.1; 264/36.14; 425/17, 23, 24, 19, 39

(56) References Cited

U.S. PATENT DOCUMENTS

| 2,757,702 A | | 8/1956 | Hawkinson ................. 152/413 |
| 3,614,969 A | | 10/1971 | Breiner ....................... 144/288 |
| 3,730,801 A | | 5/1973 | Martin ......................... 156/96 |
| 3,837,385 A | | 9/1974 | Schelkmann .............. 150/54 B |
| 3,884,739 A | * | 5/1975 | Hindin et al. ................. 156/96 |
| 3,884,740 A | * | 5/1975 | Schelkmann ................. 156/96 |
| 3,886,028 A | | 5/1975 | Hindin et al. ................ 156/394 |
| 3,895,985 A | | 7/1975 | Schelkmann ................. 156/96 |
| 3,983,193 A | | 9/1976 | Wulker et al. ................ 264/36 |
| 4,013,499 A | | 3/1977 | Benigni ...................... 156/394 |
| 4,053,265 A | | 10/1977 | Wulker et al. ................ 425/20 |
| 4,058,422 A | | 11/1977 | Taylor ......................... 156/96 |
| 4,185,056 A | | 1/1980 | Detwiler ...................... 264/36 |
| 4,500,375 A | | 2/1985 | Goldstein .................... 156/96 |
| 4,571,277 A | | 2/1986 | Goldstein .................... 156/96 |
| 4,767,480 A | | 8/1988 | Goldstein .................... 156/96 |
| 5,342,462 A | * | 8/1994 | King et al. ................... 156/96 |
| 5,467,647 A | | 11/1995 | Schepp ........................ 73/146 |

FOREIGN PATENT DOCUMENTS

| DE | 1025132 | 12/1955 |
| EP | 0153981 | 9/1985 |

OTHER PUBLICATIONS

Corresponding pending U.S. patent application, Ser. No. 09/956,165, filed Sep. 19, 2001.

* cited by examiner

Primary Examiner—Geoffrey L. Knable
(74) Attorney, Agent, or Firm—Fitzpatrick, Cella, Harper & Scinto

(57) ABSTRACT

A method and apparatus for treading a tire carcass in which a crude rubber tread is deposited on a tire carcass to be treaded, the tire carcass thus covered having been mounted on a rim and inflated, a resilient ring-shaped mold possessing an inner annular surface ensuring molding of the tread is positioned on the tread, a resilient flange is placed between each bead and each peripheral edge of the mold and covers the outer surface of the tire casing lying between the bead and the edge, and the assembly is placed in a pressurized and heated enclosure.

15 Claims, 4 Drawing Sheets

FIG.2B                    FIG.2A

METHOD AND APPARATUS OF TREADING A TIRE CARCASS

SPECIFICATION

This is a continuation of pending PCT/EP00/02321, filed Mar. 16, 2000.

BACKGROUND OF THE INVENTION

The invention concerns a method of treading vulcanized tire carcasses. These methods are generally applied today in retreading, but, of course, everything to be stated below is applicable to the treading of new tire carcasses.

There are two main types of retreading methods, one, commonly called "cold retreading," consisting of using a precured tread that is placed on a carcass ready to be retreaded, and then curing the assembly by using heating means such as an oven; the other method, called "hot retreading," consists of placing a crude rubber tread, notably, in the form of sheets, strips or sections, on a carcass ready to be retreaded and then curing the assembly in a mold.

These hot retreading methods are applied, in particular, to the retreading of large-sized tires, such as tires intended for trucks, farm machinery, construction equipment, etc., for which problems of handling and warping of treads render their use difficult in a precured form. The invention lies within the area of hot retreading.

Among the hot retreading methods, U.S. Pat. No. 4,053,265 describes a method which consists of using a resilient ring mold, preferably made of rubber, designed to make possible the molding and vulcanization of the tread. This resilient mold is placed on the tire carcass to be retreaded, which has been previously covered with a crude rubber tread, the mold-carcass assembly then being totally enveloped by a membrane ensuring tightness. Said assembly is then placed in an oven for curing after creation of a vacuum in the membrane.

More precisely, in order to ensure perfect tightness between the carcass, the tread and the resilient mold, as shown in U.S. Pat. No. 4,053,265 (FIG. 2), it is necessary to form the casing of the carcass covered by the mold by means of two resilient membranes: one so-called "inner" membrane which extends from the outer surface of the sidewalls over the entire inner surface of the carcass and a so-called "outer" casing which is covered by the first membrane at the outer surface of the sidewalls, or inversely, in order to guarantee the continuity of tightness between the two membranes, that outer membrane thus covers the whole outer surface of the mold and the part of the sidewalls not covered by the inner membrane.

The placement of those membranes is particularly difficult. In fact, it is necessary to stretch the outer membrane very extensively so that it can cover all of the tread and sidewalls, that operation being rendered even more difficult by the fact that large-sized tires are generally involved. This problem further entails very rapid wear of that outer membrane subjected to severe elastic stresses and a tendency to tear, this resulting in the need to change those membranes frequently to avoid the risks of using a damaged membrane causing defects in the manufactured tire.

U.S. Pat. No. 4,053,265 proposes an alternative to the use of these two membranes, which consists of using an outer membrane identical to that of the first solution, except that it employs an O-ring to form the seal at the sidewalls and a membrane inside the tire in the form of a tube connected to a tire casing support disk. It is clear that this solution does not solve the aforesaid problems associated with use of the outer membrane and that, furthermore, this solution makes it possible to create a good seal only on condition of vulcanizing the O-rings on the sidewalls of the tire carcass, which is problematical.

SUMMARY OF THE INVENTION

The object of the invention is a method of hot treading using a resilient ring mold which makes it possible to overcome these difficulties.

According to the invention, the method comprises the following steps:

depositing a crude rubber tread on a tire carcass to be treaded;

mounting the tire carcass thus covered on a rim, positioning on the tread a resilient ring mold possessing an inner annular surface ensuring molding of the tread and inflating the tire carcass;

placing a resilient flange between each bead and each peripheral edge of the mold, covering the outer surface of the tire casing lying between said bead and said edge; and placing the assembly in a pressurized and heated enclosure.

The invention also concerns treading apparatus including a support rim for said carcass, a resilient ring mold for molding a crude rubber tread covering the tire carcass and two resilient flanges to cover the outer surface of the tire casing thus formed, that is, the surface lying between a bead of said casing and the peripheral edge of the corresponding mold.

The choice of radial and axial directions for the retreading means as well as for the tire relates below to the axes generally used as reference in the tire, the axial direction corresponding to a direction parallel to the axis of rotation of the tire casing, and the radial planes being planes containing a radius of the tire casing and passing through said axis of rotation.

Other characteristics and advantages of the invention will appear on reading a working example of a retreading means according to the invention, with reference to the attached drawings.

DESCRIPTION OF PREFERRED EMBODIMENTS

Figure 1:
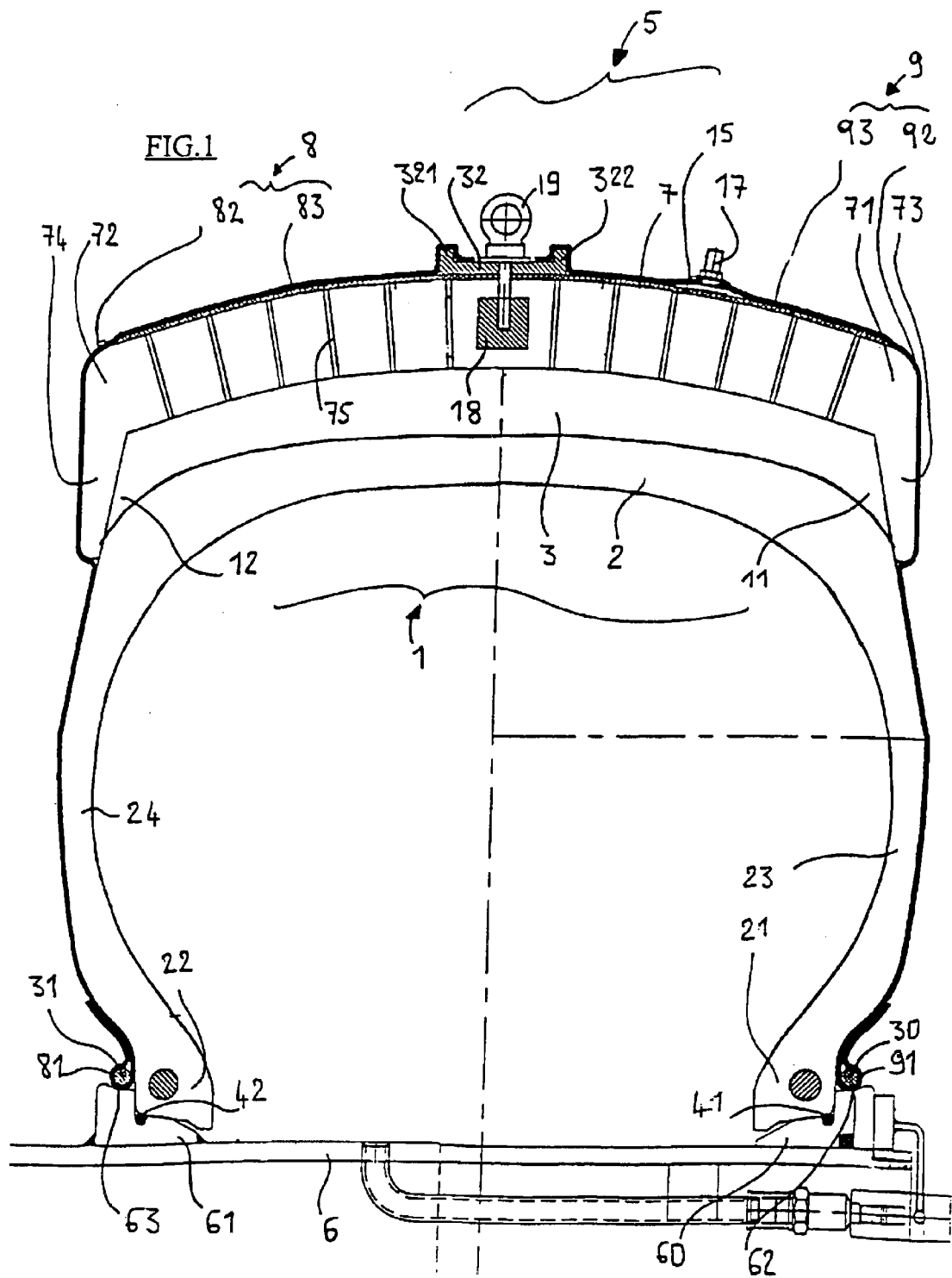
FIG. 1 is a partial radial section of the treading apparatus.

A tire casing 1 to be retreaded comprises a carcass 2 containing two beads 21, 22 and two sidewalls 23, 24 covered by a crude rubber tread 3, the tread having been deposited on the carcass 2 by any appropriate means, and shoulders 11, 12 connecting the crown of the tread 3 to the sidewalls 23, 24.

The elements common to the different working variants of the invention presented on the figures will be designated below by the same references.

According to FIG. 1, the treading apparatus 5 comprises a rim 6 on which the tire casing 1 is to be mounted, a resilient ring mold 7 for molding the tread 3 and two resilient flanges 8 and 9 for covering the outer surface of the tire casing 1 lying between a bead 21, 22 of said casing and the peripheral edge 71, 72 of the corresponding mold, in order to ensure tightness of the tire carcass 2, tread 3, resilient mold 7 and rim 6 assembly. The treading apparatus positioned on a tire casing is intended to be placed in a heated and pressurized enclosure such as an oven.

The resilient mold 7 is shown in the form of a ring, the inner surface of which defines the molding of the tread and which possesses annular peripheral edges 71, 72 extended in the form of wings 73, 74 which cover the shoulders 11, 12 of the tire casing 1.

The ring mold 7 must be sufficiently resilient in a direction oriented radially outward and must withstand the vulcanization heat without warping. The mold must also accept undergoing multiple temperature changes and resist tearing. An elastomer appropriate for obtaining the above-mentioned properties can, for example, be used to form the ring mold.

Thus, when the mold 7 is stretched, its inner diameter is greater than the outer diameter of the tire casing 1 containing the crude rubber tread 3, which makes possible the placement of the mold 7 on the latter.

Such a mold can be made, for example, according to the method presented in U.S. Pat. No. 3,983,193, in which a new tire casing is used as "molding model," which is covered by a vulcanizable crude rubber band. The assembly thus formed is put in an oven, after having been placed under vacuum which is possible due to a membrane surrounding said assembly, for purposes of vulcanization of the mold. The molding pattern appearing on the inner surface of the mold forms the tread sculpture on the new tire casing used.

The mold 7 being extracted from its "molding model," it is necessary to bore channels 75 in the mold, extending radially across the thickness of the latter for future use of the mold, in order to allow an evacuation of the air from between the mold and the carcass during molding and vulcanization of said tread.

The outer circumferential surface of the ring mold 7 is covered by a first resilient drain sleeve 15 making possible the evacuation of air through drains, which can be directly deposited on the mold. Said drain sleeve 15 can be integrated with the mold 7.

Figure 2:
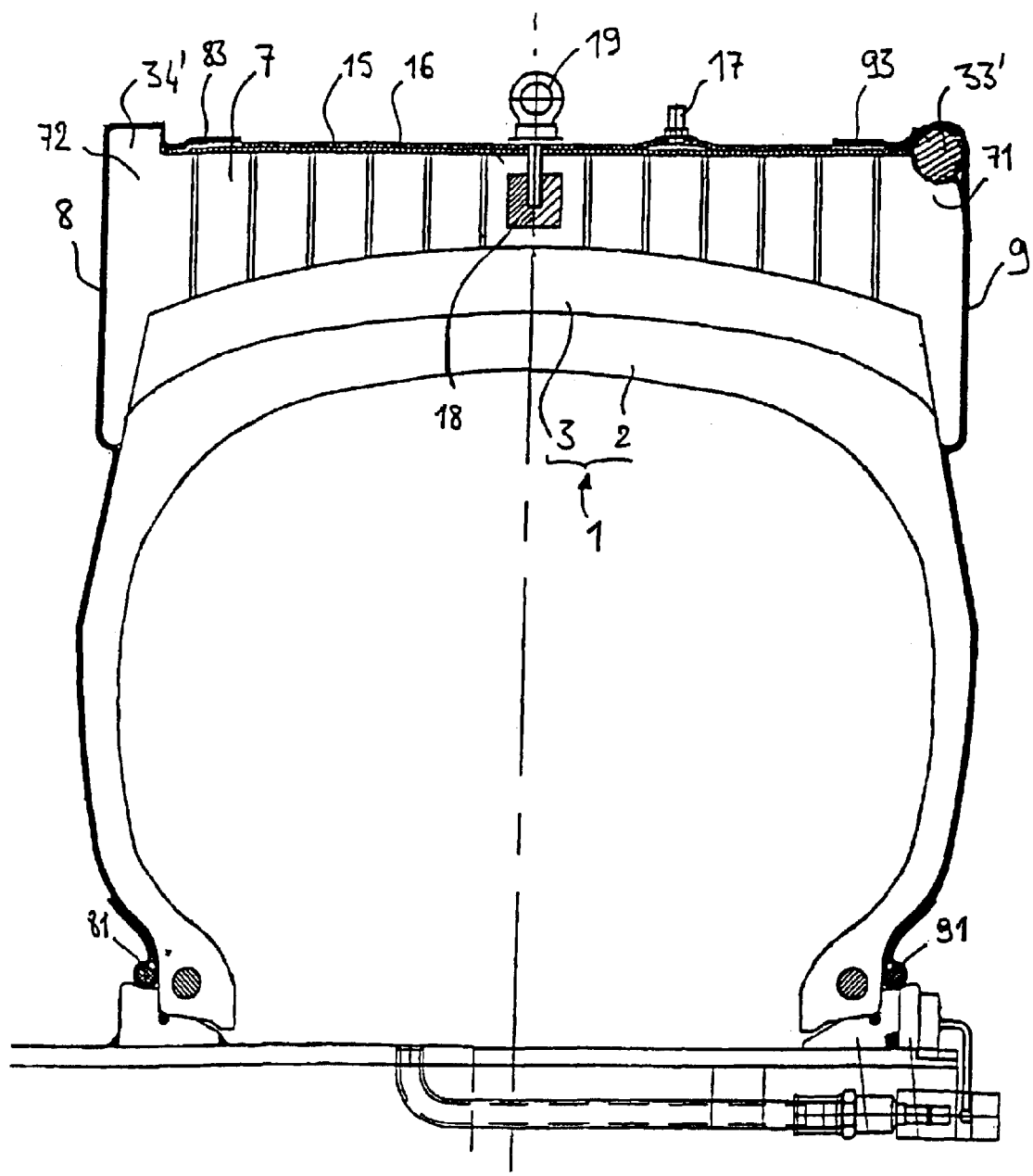
FIGS. 2A and 2B represent two partial radial half-sections of the treading apparatus represented in FIG. 1 according to two working variants.

According to the working variants represented in FIGS. 2A and 2B, the drain sleeve 15 is in turn covered by a resilient annular membrane 16 with a vulcanized elastomeric compound base, a non-return valve 17 being integrated with the resilient annular membrane 16 in order to allow a vacuum to be created.

It can also be arranged, as shown in FIG. 1, to integrate those resilient sleeves with the resilient flanges 8 and 9; it is then sufficient for one of the flanges to bear the non-return valve 17.

In order to limit and control penetration of the mold 7 in the tread, metal inserts 18 are provided inside the mold, distributed along the circumference of the latter and so that all those inserts form a ring, the sectors of which are contiguous in the compressed position of the mold.

Furthermore, those metal inserts make possible the attachment of tension rings 19 to facilitate the operations of mold stripping of the cured rubber tire casing.

The resilient flanges 8, 9 have small-diameter peripheral ends 81, 91 bearing O-ring seals 30, 31 and large-diameter peripheral ends 82, 92 extended by second sleeves 83, 93, the diameter of which is less than the outer diameter of the mold, in order to ensure elastic attachment as well as a preseal of the flanges 8, 9 on the mold 7. As FIGS. 1, 2A and 2B show, the length of said sleeves 83, 93 can be more or less extensive, as will be seen in greater detail below.

Each flange 8, 9 is made of a tight elastic material. A rubbery material may be chosen to achieve a good compromise between temperature stability and elasticity.

The O-rings 30, 31 cooperate with circumferential housings 62, 63 held respectively by the heels 60 and 61 of the rim 6. To secure a good tight fit, the diameter of the O-rings 30, 31 and, therefore, of the small-diameter ends 81, 91 of the flanges 8 and 9 is less than that of the circumferential housings 62 and 63.

The mold 7 contains an element for hooking the large-diameter peripheral ends 82, 92 of the flanges 8 and 9:

according to the variant represented in FIG. 1, each hooking element consists of a wing 321 (322) of a built-up U-section 32 detachably fastened on the center zone of the outer surface of the mold 7, so that the drain sleeve 15 is placed under that section. The simple fact that the sleeves 83 and 93 cover those wings with a certain tension makes it possible to ensure a preseal on said section 32. Said U-section 32 can be made of resilient material and be attached by any suitable means on the mold 7, so that it is easy to change it. One can also envisage in that variant making the drain sleeve 15 in three parts, with two lateral parts integral with each sleeve 83, 93 and one center part integral with the mold 7 and situated under the U-section 32;

according to the variants represented in FIGS. 2A and 2B, the hooking elements are formed respectively by an O-ring 33' vulcanized on the mold or by a sharp-edged shoulder 34' borne by the mold. In these variants, the hooking elements are borne by the peripheral edges 71 and 72 of the mold 7, which requires a somewhat lighter construction of the mold than in the previous variant, but it is not necessary for the sleeves 83 and 93 to be of great length.

The apparatus 5 also comprises, as previously stated, a rim 6 on which the tire carcass is mounted and inflated. In fact, it is important, on placement of the resilient mold 7 on the tread, for the tire casing to be inflated, in order to ensure resistance to the pressure that will be exerted by the mold on the casing and to have a uniform presentation of the casing relative to the mold so as to facilitate its placement and centering on the tread.

Furthermore, it is necessary to ensure good tightness between the carcass and the rim, particularly when the fluid used in the oven is steam. In fact, in that case, if tightness is not assured, water accumulates inside the tire casing, which results in risk of irregular curing of the casing.

The assurance of such tightness poses no major difficulties in case of treading of a new tire carcass; on the other hand, for retreading the problem is more difficult, owing to warping of the beads of the tire casing. In fact, the beads of those tire casings already mounted have undergone warping in a known manner, consisting of a tightening of the two beads to each other. It is therefore not possible to use an ordinary rim matching the tire casing as mounting support of the carcass covered with the treading apparatus, the spacing of the beads having changed.

One solution consists of using for retreading a rim provided with a tube. The problem with that solution, aside from the fact that it requires the use of an additional membrane constituted by the tube, lies in the fact that it is necessary to use a rim, the size of which matches that of the tire casing to be retreaded and, therefore, a rim for each size (which is also the case in the use of an ordinary rim for the treading of a new tire carcass).

There has been developed a new rim making possible the easy mounting and demounting of the tire casing without requiring the presence of a tube and which enables the same rim to be fitted to tire casings of different sizes in a given range. Thus, the tire carcass to be treaded is inflated on that rim by direct action of a fluid on the inner walls of said carcass.

Such a rim 6 is represented in all the figures and will be described, in particular, with reference to FIGS. 3, 4, 5A, 5B and 6.

Figure 3:
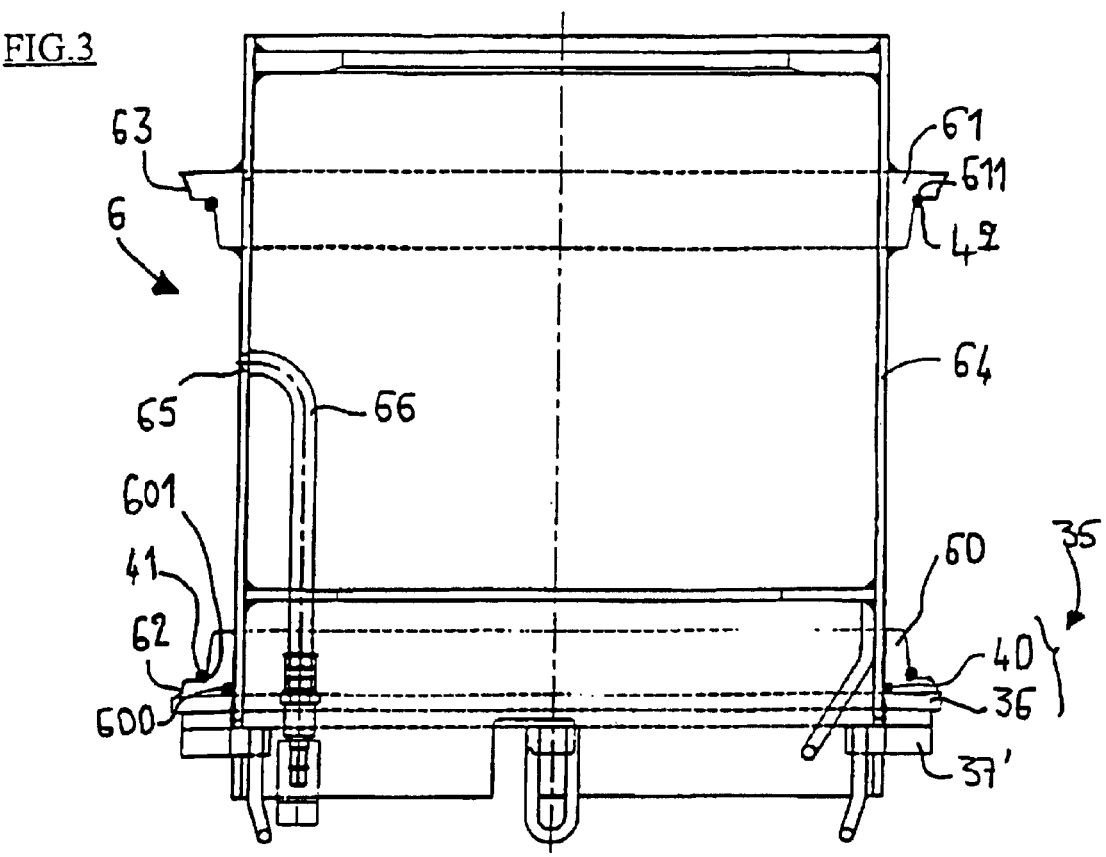
FIG. 3 is an axial section of a rim of the treading apparatus represented in FIG. 1.
Figure 4:
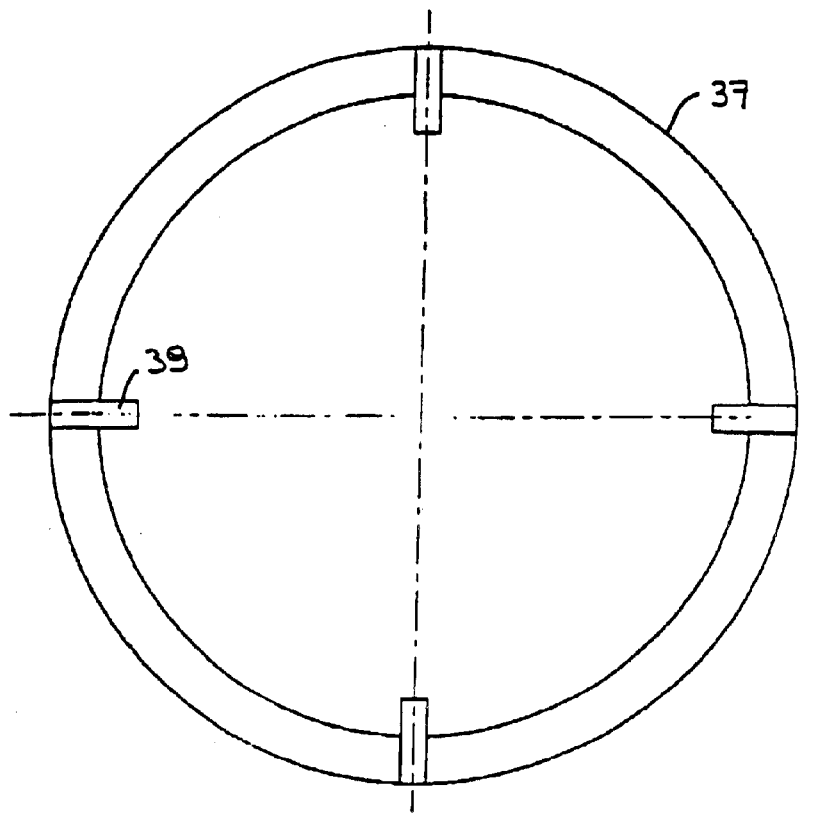
FIG. 4 is an elevation of the locking system of the rim represented in FIG. 3.

According to the variant represented in FIGS. 3 and 4, the rim 6 comprises a body in the form of a collar 64 which holds a stationary heel 61 supporting one of the beads of the tire casing and a moving heel 60 supporting the other bead. Each heel 61, 60 respectively holds a circumferential housing 63, 62 in the form of a groove which extends over the circumference of the heel, cooperating, as can be seen, with the O-rings 31, 30 held by the resilient flanges 8, 9.

The moving heel 60 is mounted sliding on the collar 64 and is removable from the latter, the rim 6 also containing a locking system 35 which makes it possible to maintain the moving heel 60 on the collars 64 and to limit the maximum spacing between the two heels 60, 61.

This locking system 35 is composed of a support washer 36 for the moving heel 60, which in turn is mounted sliding on the collar 64 and is removable from the latter, and a removable locking ring 37 which is rigidly fastened on the collar 64. This ring 37 forms in its "fixed" position a limitation on the collar 64 of the position of the moving heel 60 outward from the rim, constituting a stop for the washer 36 on which the moving heel 60 is borne, directly or through a brace 38', such as represented in the variant of the rim in FIGS. 5A and 5B. In fact, it is easy to provide for the use of dimensional tubular braces placed between the support washer and the locking ring. Such braces make it possible to adjust the rim over the nominal interwire distance corresponding to each size of tire casing and thus allow the use of the same rim for tire casings of different sizes in a given range by a simple change of brace.

The locking ring 37 bears fingers 39 oriented radially inward from said ring and cooperating with the openings, not represented, in the form of notches cut into the collar 64. After insertion of the fingers in the openings, a simple rotation of the ring 37 makes it possible to lock said ring axially on the collar 64.

Figures 5A, 5B:
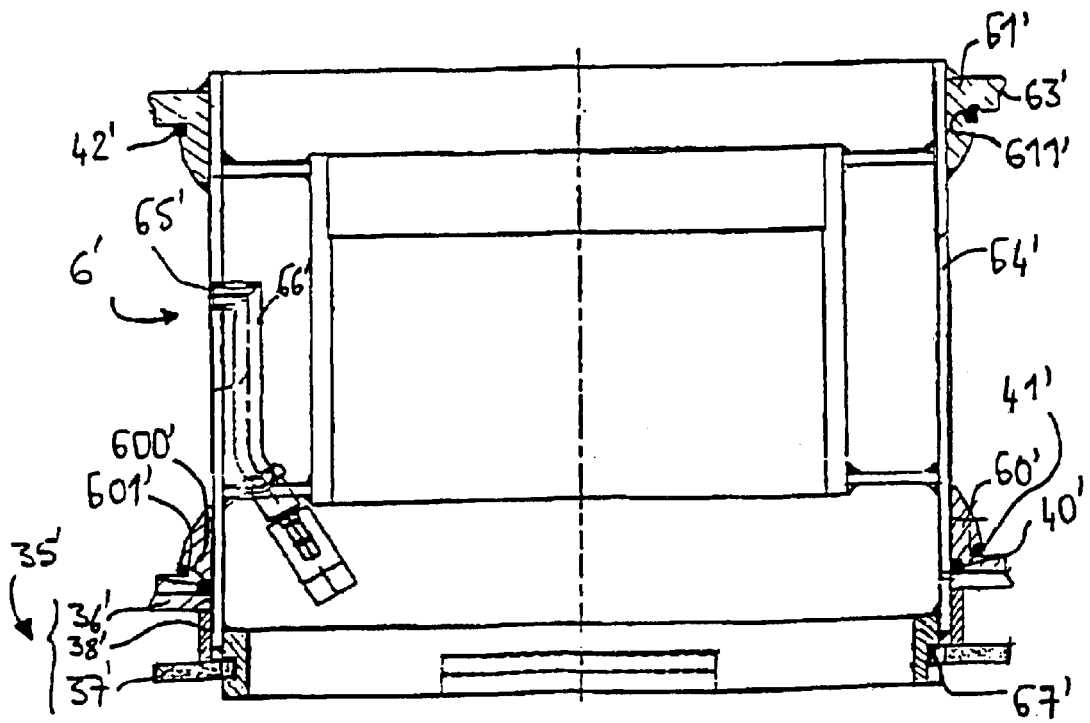
FIGS. 5A and 5B are axial sections of the rim represented in FIG. 3, according to a working variant, in locked and unlocked positions of said rim respectively.
Figure 6:
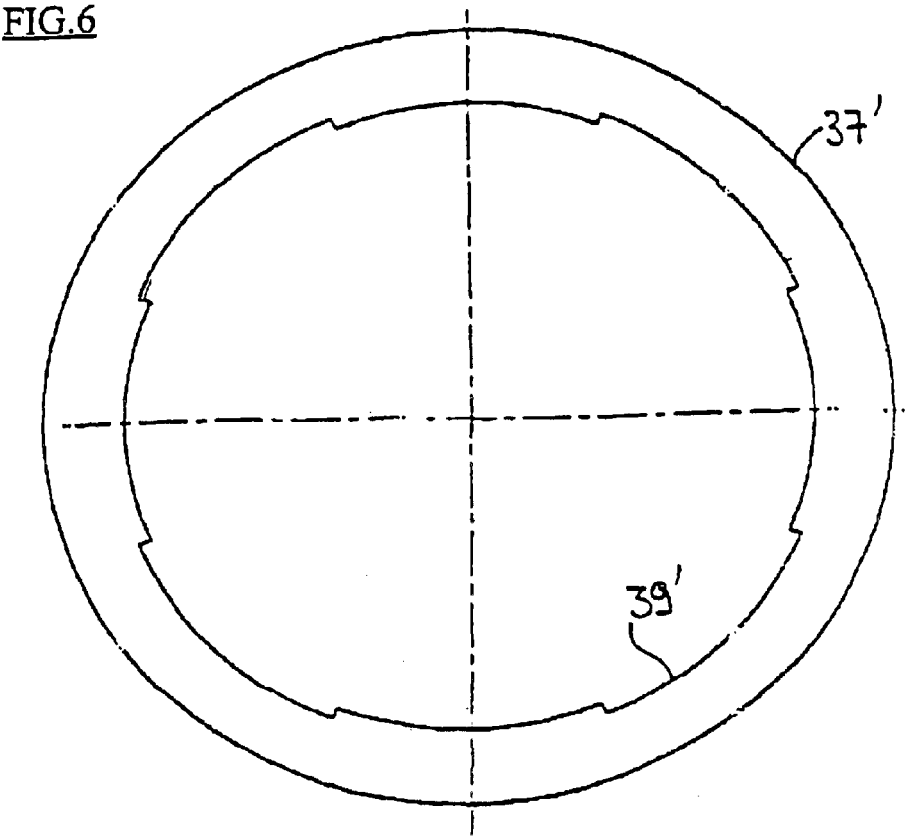
FIG. 6 is an elevation of the locking system of the rim represented in FIGS. 5A and 5B.

According to the variant represented in FIGS. 5A, 5B and 6, the rim 6' contains a locking ring 37', which bears an inner surface presenting recesses defining inner circumferential housings 39' cooperating with the recesses carried by the collar 6' and leading to a circumferential retaining groove 67', so that the rotation of the ring 37' axially locks the latter on the collar 64'. FIG. 5A illustrates the locked position of the rim 6' in which rotation of the ring 37' has been carried out, while FIG. 5B shows the relative positions of the collar 64' and of the ring 37' in unlocked position of the rim 6'.

Whatever the locking system chosen, the rim 6 (6') also contains an O-ring seal 40 (40'), the diameter of which is less than that of the collar 64 (64') for tightness and which is placed by sliding in a circumferential housing 600 (600') provided for that purpose and held by the moving heel 60 (60'). Under the effect of pressure on inflation, a preseal between the moving heel 60 (60') and the collar 64 (64') is created by the O-ring 40 (40'), which suffices to allow separation of the heels 60, 61 (60', 61') until contact of the support washer 36 (36') on the ring 37 (37') or brace 38', producing the final seal of the system.

Furthermore, it is important to provide for the presence on each rim heel 60, 61 (60', 61') of an O-ring seal 41, 42 (41', 42') positioned in a housing 601, 611 (601', 611') situated at the base of the shoulder of said rim heels 60, 61 (60', 61'), in order to guarantee the rim heel-bead bonding seal of the tire casing, even if, on inflation, a bead should not be totally positioned on that base of the shoulder. In fact, this can occasionally occur following slight dimensional variations of a bead or a slight deterioration of its surface state. Thus, depending on the position of the bead on the rim heel, the seal 41 (41') retains its volume and ensures tightness or is compressed in its housing 601 (601'), the same thing being true for seal 42 (42').

Furthermore, an opening 65 (65') connected to an air valve 66 (66') is provided in the collar 64 (64') in order to be able to inflate the carcass mounted on the rim.

The method of treading and of retreading, in particular, will be described, using the apparatus previously specified with reference to the variants represented in FIGS. 1, 3 and 4, the method using the variants of the means represented on the other figures being deduced without difficulty from the description which follows.

The tire casing 1 to be retreaded having been peeled, the carcass is mounted on the rim 6 and is inflated. Mounting on the rim 6 makes possible the use of the same support for all the steps of the method. The rim can also be used for machining and repair operations, if any, on the tire casing.

To facilitate handling, the rim 6 is positioned on a support with its axis vertical, the stationary heel 61 being placed downward and the moving heel 60 and locking system 35 assembly having been removed from the collar 64.

The tire carcass 2 is brought with its axis vertical over the rim 6 and said carcass is slid on the collar 64 as far as the stop of the lower bead of the carcass, the bead 22 according to the figures on the stationary heel 61.

The moving heel 60 is then placed on the collar 64, so that its surface receiving the bead 21 is directed toward the tire carcass 2 and that heel 60 is allowed to slide, descending naturally until making contact with the bead 21. In the same way, on the one hand, the previously greased O-ring is positioned on the collar 64 and the latter is slid until it falls naturally into place in the circumferential housing 600 borne by the moving heel 60 and, on the other, the support washer 36 abuts the heel 60 and the seal 40.

The locking ring 37 is then placed on the collar 64, so that the fingers 39 are opposite the housing borne by said collar. After sliding of the ring 37 along the collar 64, the fingers 39 enter into contact with the bottom of the notches. It is then sufficient to turn the ring 37 on the collar 64 for the fingers 39 to be moved this time circumferentially in the notched housings, which axially locks the ring 37.

The rim 6 being locked, the carcass 2 is inflated by means of the air valve 66, which pushes the upper bead 21, driving back the heel 60 and the support washer 36 to the contact stop on the ring 37, the O-ring 40 then being compressed between the support washer 36 and the moving heel 60 and ensuring final tightness.

These operations, which, as has been seen, do not require any particular precautions, but rather are operations simple to carry out, are sufficient to obtain tight mounting of the carcass 2 on the rim 6.

Furthermore, the cured tire casing will also be easily removable from said rim, since it is again positioned vertically. After deflation of the tire casing, the upper bead resumes its initial position and releases the locking ring 37 from stress, which easily makes it possible to unlock it by rotation, then sliding the different removable elements outward from the rim.

The stage of mounting and inflation of the carcass 2 being completed, the latter is rubberized by placement of a crude rubber tread, laying down, for example, a rubbery compound in the form of strips preceded by placement of an intermediate layer, commonly called "bonding rubber."

In order to place the resilient mold 7 on the tire casing 1, the latter first undergoes a circumferential elongation. Thus, the resilient mold 7 is stretched radially, notably, by means of its wings 73, 74, so that its inner diameter is greater than the outer diameter of the tread 3. It is advantageously arranged to treat the inner surface of the resilient mold 7 by means of an antiadhesive agent in order then to allow the mold stripping operation.

The mold 7 being maintained in that stretched position, the tire casing 1 is placed inside the latter, so that the tread 3 is axially centered relative to the mold 7. The tensile stress exerted on the mold 7 compressed on the tread 3 is then relaxed. As has been previously seen, the metal inserts 18 distributed around the circumference of the mold 7 make it possible to guarantee the thickness of rubber it is desired to provide between the carcass 2 and the bottom of the sculptures.

Different types of known equipment make possible the spacing and positioning of the mold in that operation.

To install the resilient flanges 8 and 9 on the tire casing 1, one can proceed in two stages, consisting of positioning the tire casing 1 and its rim 6 with axis vertical, in order to lay flat the first flange and then turn over the casing and rim assembly to deposit the second flange. It is also possible to place the second flange without turning over the casing, by providing for sufficient accessibility under the latter. These placement operations being identical, the placement only of one flange will be described.

Free of any stress, the sleeve 83 is folded over the flange 8, the flange being, in fact, a resilient element.

The small diameter peripheral end 81 of the flange 8, which bears the O-seal 30, is positioned first. For such purpose, this end 81 is stretched slightly in order to position the O-ring 30 in its housing 63 on the corresponding heel 61, the diameter of the O-ring 30 and, therefore, of the end 81 being slightly less than that of the housing 63. This difference in diameter makes it possible, owing to the elasticity of the seal and flange, to ensure elastic attachment between the flange 8 and the heel 61.

The sleeve 83 is opened and it is then stretched to enable it to cover the peripheral edge 72 of the mold 7 and to cap the wing 321 of the U-section 32.

This simple action therefore makes possible, without the need for extra attachment, placement of the flange 8 covering the top of the bead 22 of the tire casing 1, its sidewall 24, the wing 74 of the mold 7, its peripheral edge 72 and a part of the crown of the mold 7. One can, furthermore, envisage, due to this covering of the entire surface of the sidewall, a new marking of the sidewall.

The flanges 8 and 9 are paired to the mold 7, not working under heavy stress, which constitutes an essential difference from the system existing in the prior art and using outer and inner membranes, as was previously seen.

The flanges 8 and 9 having been set in place, the air between the mold 7, the flanges 8, 9 and the tire casing 1 is evacuated through the valve 17, which will also be used later to evacuate the vulcanization gases. In fact, it is indispensable to exhaust the air trapped between the tread 3 and the mold 7, so as to obtain good reproducibility and molding of the tread sculptures.

The whole tire casing 1 and treading apparatus 5 can then be placed inside an oven, in order to proceed with vulcanization of the tread. Maintenance of a positive differential pressure between the inside of the tire casing and the oven is provided by any appropriate system.

When the vulcanization operation is completed, the cured tire casing and treading apparatus assembly is taken out of the oven. It is then very easy to remove the two flanges and then, using the same equipment as previously, to stretch the mold in order to extract the retreaded tire casing mounted on its rim, subsequent demounting of the latter not presenting any difficulty, as already indicated.

I claim:

1. A method of treading a tire carcass, comprising:
    depositing a crude rubber tread on a tire carcass to be treaded;
    mounting the tire carcass on a rim and inflating the tire carcass;
    placing on the tread a resilient ring-shaped mold having an inner annular surface for molding the tread;
    placing a resilient flange between each bead of the tire carcass and each corresponding peripheral edge of the mold, covering the outer surfaces of the tire carcass lying between each bead and each corresponding edge;
    placing the resulting tire carcass and rim assembly in a pressurized and heated enclosure,
    wherein each resilient flange is positioned with an edge thereof partially overlapping a raised member positioned along a central periphery of the mold, so as to leave a gap between the resilient flanges.

2. A method according to claim 1, in which the tire carcass is mounted and inflated prior to depositing the crude rubber tread on the tire carcass.

3. A method according to claim 1, in which the tire carcass is inflated by direct action of fluid on the inner walls of the tire carcass.

4. A method according to claim 1, in which each resilient flange has a small diameter peripheral end and a large diameter peripheral end and is placed on the tire carcass by elastic attachment of its small diameter peripheral end on a heel of a rim and of its large diameter peripheral end on a peripheral edge of the mold.

5. A method according to claim 4, in which the attachment of the small diameter peripheral end of each resilient flange is made by an O-ring carried by the end, which cooperates with a circumferential housing carried by a heel of the rim.

6. A method according to claim 4, in which the large diameter peripheral end of each flange is attached to the resilient mold by covering a hooking element on the mold.

7. A method of treading a tire carcass, comprising:
    depositing a crude rubber tread on a tire carcass to be treaded;
    mounting the tire carcass on a rim and inflating the tire carcass;
    placing on the tread a resilient ring-shaped mold having an inner annular surface for molding the tread;
    placing a resilient flange between each bead of the tire carcass and each corresponding peripheral edge of the mold, covering the outer surfaces of the tire carcass lying between each bead and each corresponding edge;

placing the resulting tire carcass and rim assembly in a pressurized and heated enclosure, wherein each resilient flange has a small diameter peripheral end and a large diameter peripheral end and is placed on the tire carcass by elastic attachment of its small diameter peripheral end on a heel of a rim and of its large diameter peripheral end on a peripheral edge of the mold, and the large diameter peripheral end of each flange is attached to the resilient mold by covering a hooking element on the mold.

8. A method according to claim 7, in which the tire carcass is mounted and inflated prior to depositing the crude rubber tread on the tire carcass.

9. A method according to claim 7, in which the tire carcass is inflated by direct action of fluid on the inner walls of the tire carcass.

10. A method according to claim 7, in which the attachment of the small diameter peripheral end of each resilient flange is made by an O-ring carried by the end, which cooperates with a circumferential housing carried by a heel of the rim.

11. A method of treading a tire carcass, comprising:

depositing a crude rubber tread on a tire carcass to be treaded;

mounting the tire carcass on a rim and inflating the tire carcass;

placing on the tread a resilient ring-shaped mold having an inner annular surface for molding the tread;

placing a resilient flange between each bead of the tire carcass and each corresponding peripheral edge of the mold, covering the outer surfaces of the tire carcass lying between each bead and each corresponding edge;

placing the resulting tire carcass and rim assembly in a pressurized and heated enclosure, wherein each resilient flange is positioned with an edge thereof partially overlapping a resilient drain sleeve positioned along a central periphery of the mold, so as to leave a gap between the resilient flanges.

12. A method according to claim 11, in which the tire carcass is mounted and inflated prior to depositing the crude rubber tread on the tire carcass.

13. A method according to claim 11, in which the tire carcass is inflated by direct action of fluid on the inner walls of the tire carcass.

14. A method according to claim 11, in which the attachment of the small diameter peripheral end of each resilient flange is made by an O-ring carried by the end, which cooperates with a circumferential housing carried by a heel of the rim.

15. A method according to claim 11, wherein an annular membrane is positioned between the resilient drain sleeve and the resilient flanges.

* * * * *